United States Patent [19]
Colby et al.

[11] Patent Number: 6,038,456
[45] Date of Patent: *Mar. 14, 2000

[54] MOBILE TELECOMMUNICATION SYSTEM

[75] Inventors: James Edward Colby, Stroud; Dominic Desmond Phelim O'Neill, Bristol, both of United Kingdom

[73] Assignee: Orange Personal Communications Service Limited, Bristol, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/809,767

[22] PCT Filed: Apr. 10, 1995

[86] PCT No.: PCT/GB95/02352

§ 371 Date: Jun. 9, 1997

§ 102(e) Date: Jun. 9, 1997

[87] PCT Pub. No.: WO96/11557

PCT Pub. Date: Apr. 18, 1996

[30] Foreign Application Priority Data

Oct. 5, 1994 [GB] United Kingdom .................. 9420098

[51] Int. Cl.⁷ ...................................... H04Q 7/20
[52] U.S. Cl. ........................................ 455/456; 455/524
[58] Field of Search ................... 455/422, 432, 455/433, 435, 456, 457, 517, 524

[56] References Cited

U.S. PATENT DOCUMENTS 5,579,375  11/1996  Ginter ..................................... 455/433
5,781,858  7/1998  Lantto et al. .......................... 455/433

FOREIGN PATENT DOCUMENTS 27 17 678  2/1981  Germany .
WO 91/11890  8/1991  Sweden .

OTHER PUBLICATIONS

"PCS Number Portability" article by Arthur Giordano and May Chan of GTE Laboratories, Inc., Waltham, MA, *PIMRC '94/WCN*.

"Directory Services for Mobility Management in Private Telecommunication Networks", ICC '93 Geneva IEEE International Conference on Communications, May 23–26, 1993, pp. 1252–1256.

*Primary Examiner*—Nguyen Vo
*Assistant Examiner*—Sam Bhattacharya
*Attorney, Agent, or Firm*—Townsend and Townsend and Crew

[57] ABSTRACT

This invention relates to a telecommunications system including a plurality of mobile telephones. The telecommunications system has a switch network including: data storage units (HLR) for storing connection data relating to respective mobile telephones; a register (15) for storing associations between the data storage units and respective identification codes; inputs for inputting an identification code; and a switch unit (30, 31) for interrogating the register (15) to determine the data storage unit (HLR) associated with that identification code. The switch network then uses the connection data stored by the data storage unit (HLR) to form a telecommunication link with the corresponding mobile telephone. The associations stored by the register (15) can be changed.

7 Claims, 2 Drawing Sheets

MOBILE TELECOMMUNICATION SYSTEM

BACKGROUND OF THE INVENTION

1. Field of the Invention

The present invention relates to a telecommunication system. The present invention is particularly, but not exclusively, concerned with a telecommunications system for mobile telephones.

2. Summary of the Prior Art

In standard land-based telecommunications systems, calls are routed from one fixed point to another, and it is therefore relatively straightforward to determine a switching path for such calls. The originator of the call inputs information to the system (normally the telephone number of the destination) in which the routing information is arranged sequentially. Thus, it is relatively straightforward for the system to determine the switching necessary to achieve the routing, by successively decoding parts of the input information. Any switching point need consider only part of the information.

When the telecommunication system involves mobile telephones, the situation is more complicated because a call to a mobile telephone is not to a fixed point, and therefore the system must determine the location of the destination. Currently, a call to a mobile telephone results in a signal being transmitted to a data storage unit in the form of a Home Location Register unit (HLR) which determines the location of the mobile telephone, and so permits routing of the call to occur.

Inevitably, HLRs have a limited capacity, and some arrangement is therefore necessary to enable telecommunication systems to access multiple HLRs. At first sight, all that is needed is for a plurality of HLRs to be provided, and different mobile telephone numbers assigned to different HLRs.

However, this is not consistent with the aim of providing customer flexibility in a mobile telephone system. Each mobile telephone has two types of number associated with it, one being the number which third parties use to call the mobile telephone (a "MSISDN"), and the other being an identity number (an "IMSI") which is used by the telecommunications system to address the mobile telephone. Using existing techniques, information relating to both of these numbers must be stored on the same HLR.

It is envisaged that users may need multiple MSISDN numbers, for example if a user is to have the possibility of both voice and data communication, in existing systems, any second MSISDN number with a common identity number (IMSI) must be a MSISDN number of the same HLR as the previous MSISDN number. This could be impossible to achieve if, for example, the HLR containing the original information is full. Then the only way that additional services could be provided would require the user to change telephone number, which would be undesirable. This becomes a particular problem if it is desirable that users are able to select their numbers, rather than be provided with them.

SUMMARY OF THE INVENTION

To overcome these problems, the present invention proposes that the switch network which connects users to other users, HLRs, and system services, has a register unit associated therewith, which register unit contains information relating each telephone number to a corresponding one of a plurality of HLRs. The relationship between telephone numbers and HLRs should then be freely selectable within the register unit, so that the register unit acts as a converter between the number and the information identifying the HLR.

By providing such a register unit, the fixed relationship between numbers and HLRs is broken, and any number may be assigned to any HLR, assuming space permits.

The register unit may also store further information associated with the mobile telephones which permits the switch network to enable calls from mobile telephones to be routed to different services, depending on the calling mobile telephone itself, in addition to the number dialled.

As a first example, different mobile telephones provided by different organisations (Service Providers) could use the same generic access code e.g. 150, to call the parent Service Provider regarding billing queries for example. It is convenient if such services are accessed by numbers which are independent of the organisation providing the service. Then, a call from a mobile telephone to such a service triggers a signal to the register unit which generates information which identifies the service unit associated with that number for the particular mobile telephone. That identification information may then be passed back to the switch network to enable the call to be routed to the correct service unit.

As a second example, users could be able to access voice mail in respective personal mail boxes by dialling a second generic access code, say 123, the register providing information necessary for routing of the call.

In either case, the system may be adapted so that if the user is using a public telephone, rather than his own mobile phone, he can convey manually to the switch network information sufficient for the switch network to obtain from the register the further information associated with the user's mobile telephone.

A further possibility is for the register to use the further information concerning the mobile telephones in relation to calls to the telephones, rather than from the telephones. For example, the further information may be sufficient to redirect a telecommunications link originally destined for a given mobile telephone if that phone is unavailable, perhaps because it is engaged or inoperative or because its owner does not answer. Such a system may for example be capable of operating such that if a person attempts to contact a mobile phone which is unavailable, the switch network can redirect the call to an appropriate service, such as a voice mail service.

By using the present invention, many advantageous features of the telecommunication system can be achieved. If there is any failure in the unit of the mobile telephone which identifies the mobile telephone (that unit being referred to as a SIM), it should be possible to replace that unit quickly. With the present invention, even if the new identity number IMSI provided to the user relates to a different HLR from the previous identity number IMSI, the user need not change their telephone number (MSISDN number), since the reassignment to the new HLR may be achieved by the register unit.

Hence, any telephone number (MSISDN number) may be mapped onto any user identity.

An embodiment of the present invention will now be described in detail, by way of example, with reference to the accompanying drawings, in which:

FIG. 1 is a schematic block diagram of a telecommunication system incorporated in the present invention; and FIG. 2 shows part of the telecommunication system of FIG. 1 in more detail.

DETAILED DESCRIPTION

Figure 1:
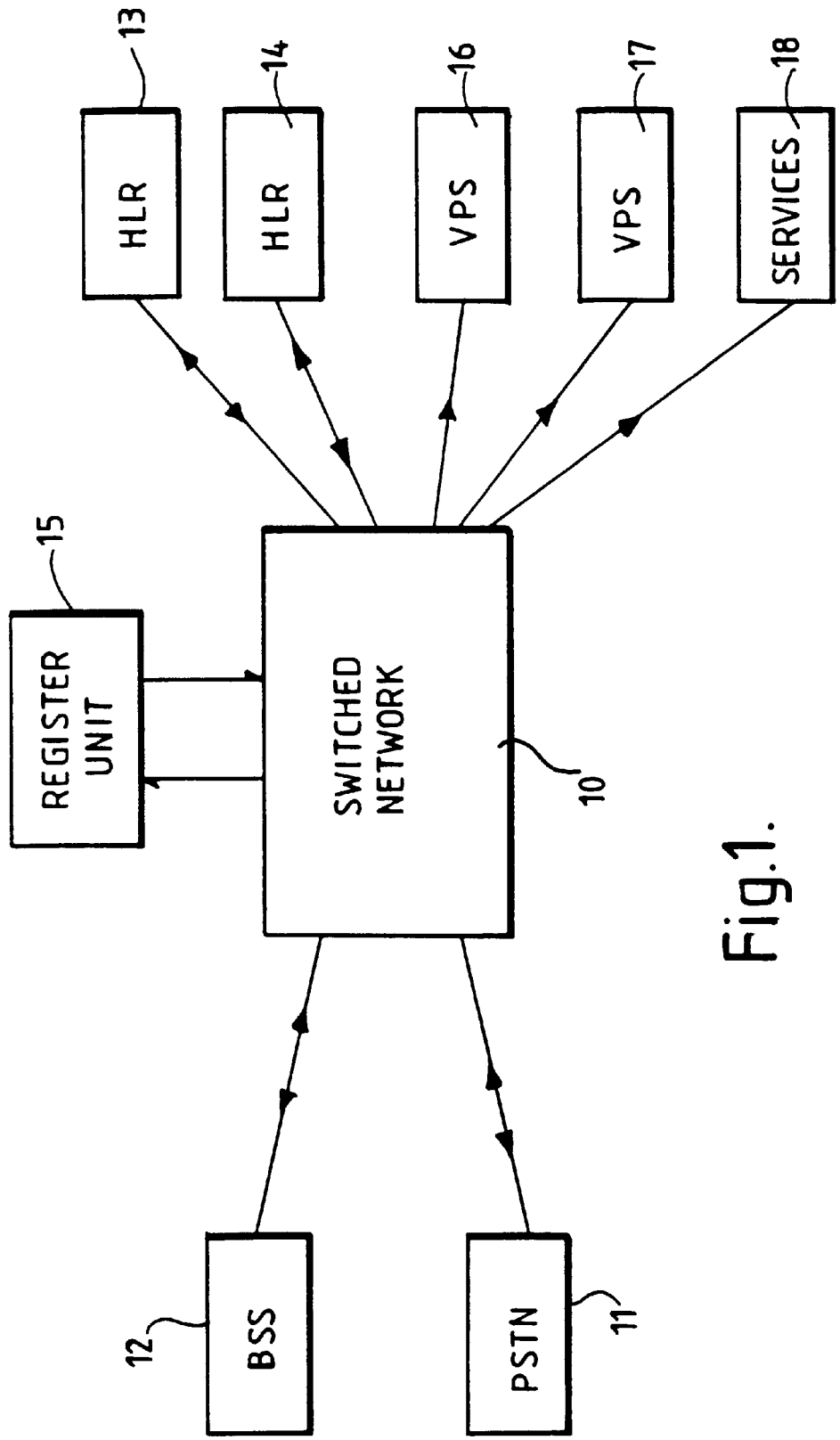

Referring first to FIG. 1, a switched network 10 interconnects land-based and mobile telephones. If a call to a mobile telephone is made from a land-based telephone, the call is routed via the public switch telephone network (PSTN) 11 to the switch network, and from that switch network 10 to the mobile telephone (BSS) 12. To do this, the switch network 10 must determine routing information, and to determine that routing information it must determine the location of the mobile telephone 12, which it does via a HLR to which the mobile telephone 12 is associated. When there are multiple HLRs 13,14, it is necessary for the switch network 10 to determine which HLR 13,14 must be accessed, on the basis of the telephone number (MSISDN number) of the mobile telephone input by the originator of the call.

In accordance with the present invention, the switch network 10 accesses a register unit 15, which identifies the called number and addresses it to a particular HLR 13,14 with which the mobile telephone 12 is associated. The register unit 15 permits the relationship between any given mobile telephone number and the HLRs 13,14 to be determined freely, so that the number is unaffected by the particular HLR 13,14 with which it is associated. The register unit 15 removes the need for a particular mobile telephone number to be associated with a fixed HLR 13,14.

Once the particular HLR 13,14 with which the mobile telephone 12 is associated has been identified, signalling can occur to that HLR, and information derivable therefrom, in the usual way. This information is used to "set-up" the call to the mobile telephone 12, which may then be routed to the destination telephone as is normal.

Similarly, if a call originates at the mobile telephone 12, the switch network 10 must again determine the routing of that call. If the call is to a land-based telephone, connected to the switch network 10 via the PSTN 11, then this routing can be on the basis of the telephone number of the destination telephone, in the normal way.

If a call is made from a mobile telephone 12 to one of a plurality of voice processing systems 16,17 or to services 18 associated with the switch network using a short code (e.g. 123) the relationship between the mobile telephone 12 and the corresponding service must be determined by the register unit 15 before the switch network can determine the appropriate voice processing system 16,17 or services 18 to be accessed.

It should be noted that existing systems are similar to the arrangement shown in FIG. 1, but without the register unit 15 and with only a single HLR. Such existing systems do not need to determine which HLR is to be accessed, since there is only one such HLR. To achieve the present invention, the switch network 10 accesses the register unit 15 when handling any call that would result in a signalling enquiry to the HLR in the existing arrangements, to determine which of the multiple HLRs 13,14 is to be accessed. Hence, the present invention can be achieved by the provision of the register unit 15, and suitable programming of the switch network 10.

Figure 2:
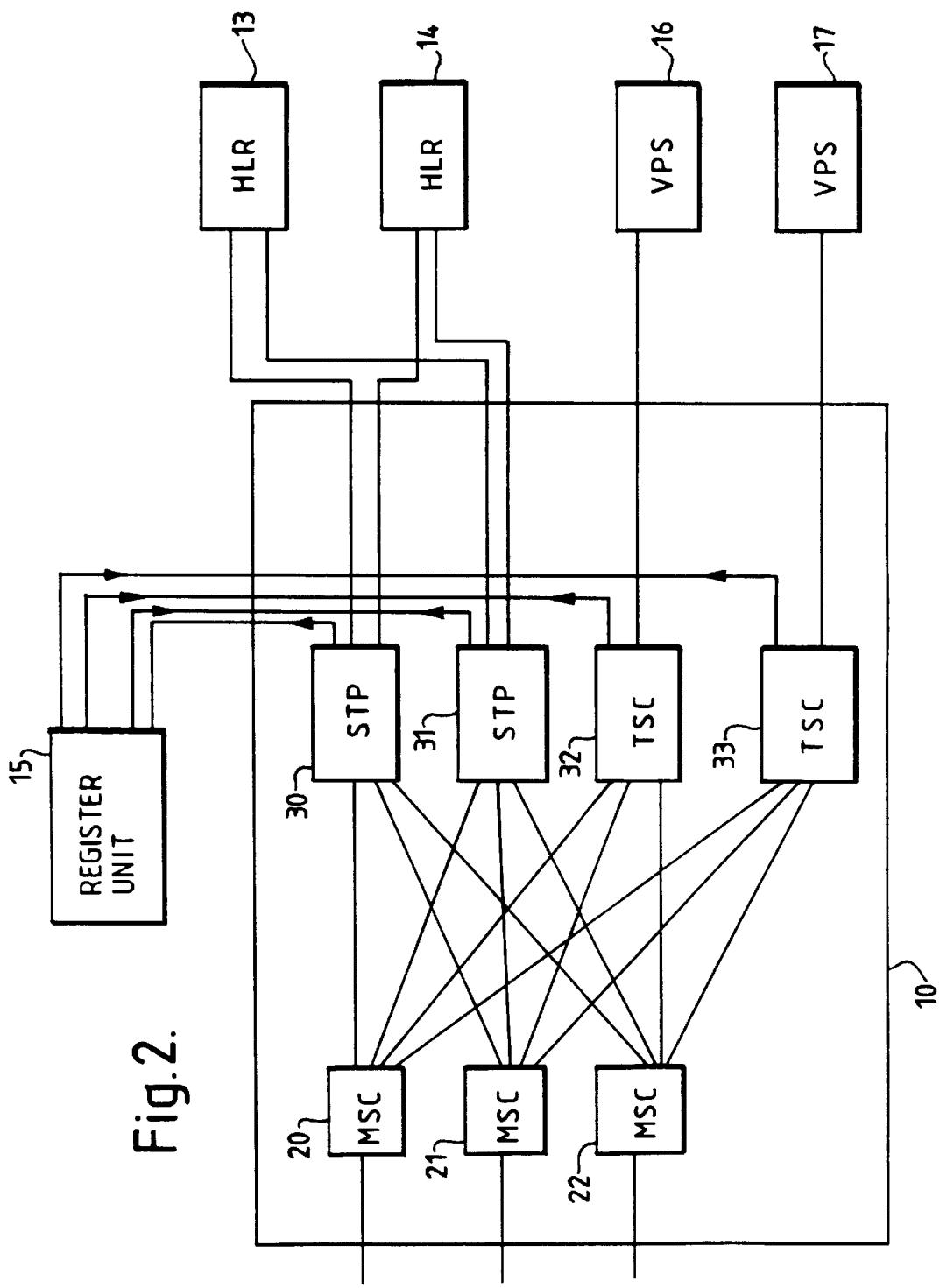

FIG. 2 shows the switch network 10 in more detail. It will have a plurality of mobile switching centres (MSC) 20,21 and 22, and a call destined to any given mobile telephone results in signalling between that MSC 20 to 22 and one of a plurality of signalling transfer points (STP) 30,31, which signal to the register unit 15 to determine the HLR 13,14 which is appropriate to the mobile telephone 12. The register unit 15 determines that information from the telephone number (MSISDN number) of the mobile telephone 12. It would then be possible for the register unit 15 to forward the signal directly to the appropriate HLR 13,14 but, as shown in FIG. 2, it is preferable that the information is passed back to the corresponding STP 30,31 which then passes the signalling to the correct HLR 13,14.

A similar signalling flow is seen when the user of the mobile telephone 12 tries to access one of the voice processing systems (VPS) 16,17. The call is received by one of the MSCs 20,21 and 22 which passes the dialled digits and the identity of the mobile telephone to one of the STPs 30,31,32. This relays the information to the register unit 15, which uses this information to construct the correct address of the appropriate voice processing service (VPS) 16,17. That information is relayed back from the register unit via one of the STPs 30,31,32 to the original MSC 20,21,22. This address is then used to route the call by the switch network 10. That routing passes the call from the appropriate MSC 20,21,22 via the switch network (comprising transit switching centres, TSCs 32,33) to the appropriate VPS 16,17.

The signal which a mobile telephone passes to the switch network, and by which the mobile telephone is recognised, need not be fixed, but may be alterable, for example by insertion into the telephone of a card carrying data. Thus, a user can identify himself or herself to the switch network by insertion into a mobile telephone of a personal card which identifies him or her, and subsequent routing to an appropriate VPS can be performed on the basis of the user's identity.

The facility of routing calls to VPS using information in the register unit 15 will enable the location of individual voice processing services (such as mailbox accounts) at locations which have the closest geographical proximity to where the mobile telephone will predominantly be located. This can dramatically reduce the cost of call transportation.

Moreover, if the predominant location of the mobile telephone changes, so that it is more convenient to use a different VPS 16,17, then this change can be logged in the register unit 15. The calling subscriber can still access his VPS account (although now hosted by a different platform) without changing the number used to call the service. Similarly, if the user of the mobile telephone changes from one service provider to another, the register unit 15 can accommodate this change without the user having to dial different numbers. Thus, for example, where there are several service providers and the user of the mobile telephone changes from one service provider to another, it is not necessary for that user to dial different numbers to reach the new service provider. Instead, the same numbers can be used and the new routing of the call is controlled by the signals passed between the MSC 20,21,22 and the register unit 15.

The switch network 10 may also use the information about the mobile phones so that if a given phone is engaged, unanswered or inoperative, the switch network can redirect calls originally directed to that phone to an appropriate VPS, such as a voice message system.

We claim:

1. A switch network for a telecommunication system including a plurality of mobile telecommunication devices, the switch network comprising:

a plurality of data storage units for storing connection data relating to one or more respective telecommunication devices and for determining the location of said one or more respective mobile telecommunication devices;

a register unit common to the data storage units for storing associations between the data storage units and one or more respective identification codes;

input means for inputting an identification code;

a switch unit for interrogating the register unit to determine the data storage unit associated with that identification code;

link means for using the connection data stored by that data storage unit to form a telecommunication link with one of the corresponding one or more mobile telecommunication devices; and means for altering the associations stored by the register unit;

wherein the link means is configured to bypass the register unit to form a link with the corresponding one or more mobile telecommunication devices using the connection data once the data storage unit associated with that identification code has been determined.

2. A switch network according to claim 1 wherein the connection data is location data indicating the location of the corresponding one or more telecommunication devices.

3. A switch network according to claim 1 in which the register unit stores further information associated with the telecommunication devices, the switch network including means for interrogating the register unit in response to a signal to extract the further information associated with a specified telecommunication device, the link means forming a telecommunications link in dependence upon said further information.

4. A switch network according to claim 3 further comprising means for changing said further information.

5. A telecommunication system comprising:

a plurality of mobile telecommunication devices; and a switch network comprising:

a plurality of data storage units for storing connection data relating to one or more respective telecommunication devices and for determining the location of said one or more respective mobile telecommunication devices;

register unit common to the data storage units for storing associations between the data storage units and one or more respective identification codes;

input means for inputting an identification code;

a switch unit for interrogating the register unit to determine the data storage unit associated with that identification code;

link means for using the connection data stored by that data storage unit to form a telecommunication link with one of the corresponding one or more mobile telecommunication devices; and means for altering the associations stored by the register unit;

wherein the link means is configured to bypass the register unit to form a link with the corresponding one or more mobile telecommunication devices using the connection data once the data storage unit associated with that identification code has been determined.

6. A telecommunication system according to claim 5 wherein at least some of said telecommunication devices are associated with services provided to the user.

7. A switch network for a telecommunication system including a plurality of mobile telecommunication devices, the switch network comprising:

a plurality of data storage units which are configured to store connection data relating to one or more respective telecommunication devices and which are configured to determine the location of said one or more respective mobile telecommunication devices;

a register unit common to the data storage units which is configured to store associations between the data storage units and one or more respective identification codes;

an input system which is operable to input an identification code;

a switch unit configured to interrogate the register unit to determine the data storage unit associated with that identification code;

a linking system arranged to use the connection data stored by that data storage unit to form a telecommunication link with one of the corresponding one or more mobile telecommunication devices; and an alteration system arranged to alter the associations stored by the register unit;

wherein the linking system is configured to bypass the register unit to form a link with the corresponding one or more mobile telecommunication devices using the connection data once the data storage unit associated with that identification code has been determined.

* * * * *

UNITED STATES PATENT AND TRADEMARK OFFICE
CERTIFICATE OF CORRECTION

PATENT NO. : 6,038,456
DATED : March 14, 2000
INVENTOR(S) : James Edward Colby, et. al.

It is certified that error appears in the above-indentified patent and that said Letters Patent is hereby corrected as shown below:

Title page [22], delete "April 10, 1995" and insert —October 4, 1995--.

Signed and Sealed this

Tenth Day of April, 2001

Attest:

NICHOLAS P. GODICI

Attesting Officer     Acting Director of the United States Patent and Trademark Office